United States Patent Office 3,000,335
Patented Sept. 19, 1961

3,000,335
DIAPHRAGM ASSEMBLY APPARATUS
William A. Raub, Haverford, and Roy Ullman, Willow Grove, Pa., assignors to The E. F. Griffiths Company, Philadelphia, Pa., a corporation of Pennsylvania
Filed July 18, 1958, Ser. No. 749,468
6 Claims. (Cl. 113—1)

This invention is concerned with apparatus for use in manufacturing diaphragm assemblies such as employed in gas flow regulating or recording meters, for example, of the kind disclosed in Patent No. 2,884,782.

Generally speaking, diaphragm assemblies of the kind in question comprise a rigid ring-like mounting frame carrying a flexible body of diaphragm material such as leather or a suitable synthetic. The diaphragm assembly is connected between hermetically isolated internal measuring chambers of a meter and the diaphragm material is adapted to pulsate back and forth upon the application of unbalanced gas pressures on opposite sides thereof. The connection between the mounting frame and diaphragm material must be gas tight, otherwise the meter may be inoperative or inaccurate, particularly at low volumes of gas.

With the foregoing in mind, the principal object of the present invention is to provide apparatus for economically producing diaphragm assemblies having positive gas-tight seals and, in particular, to provide such a machine wherein the gas-tight seal is accomplished by crimping the diaphragm material tightly within a channel on the mounting frame.

The preferred embodiment of the apparatus of the invention, together with the various features thereof, will be apparent from the following specification taken in conjunction with the drawings wherein.

Figures 1, 2:
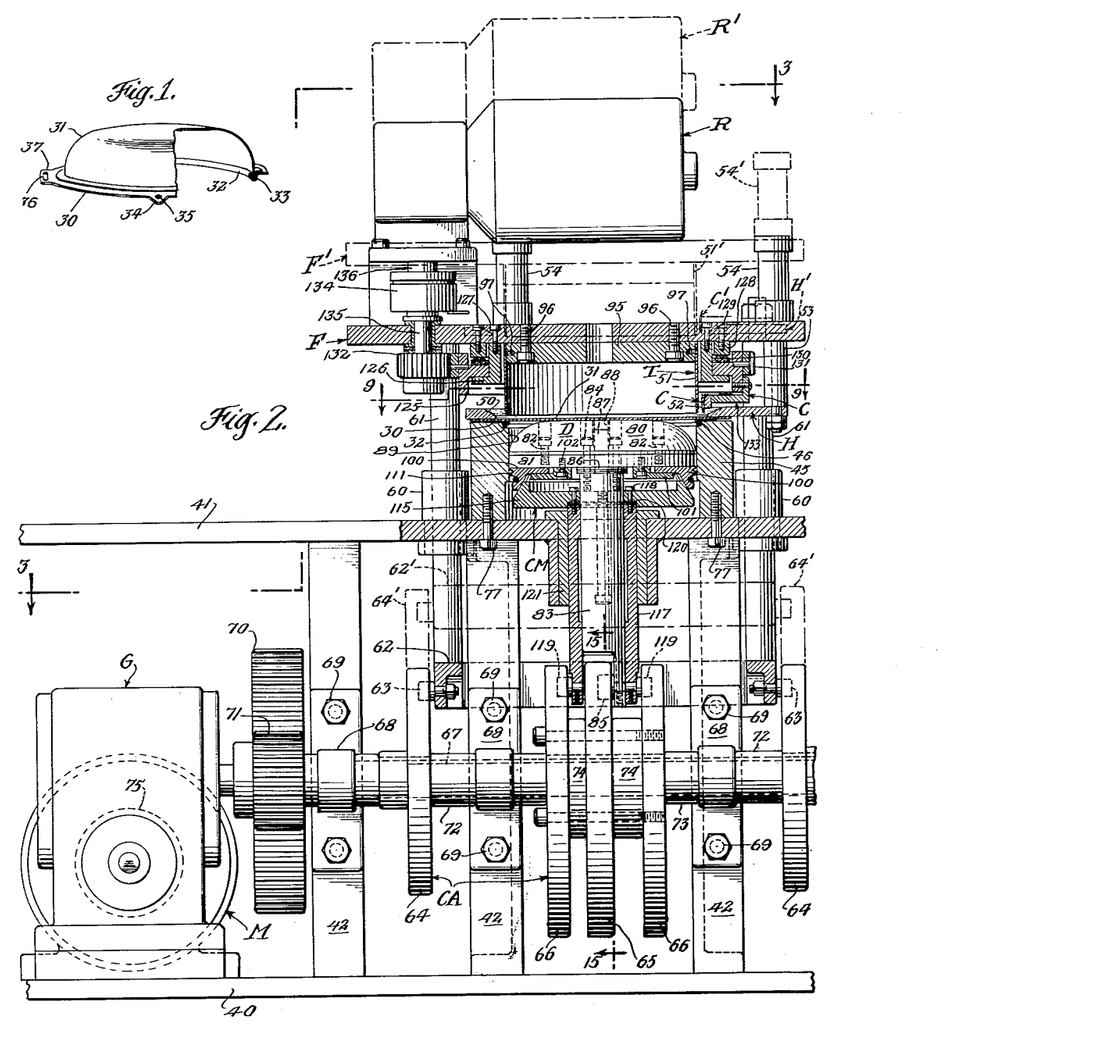
FIGURE 1 is a perspective view, partly in section, of a typical gas meter diaphragm assembly.
FIGURE 2 is a sectional elevational view of the apparatus taken as indicated by the line 2—2 of FIGURE 3.

A typical diaphragm structure assembled by the apparatus of the present invention is illustrated in FIGURE 1 and comprises an annular frame or mounting ring 30 and a diaphragm 31 of flexible material, preferably tough material such as leather or leather-like fibrous or plastic materials, particularly suited for use in gas meters. The frame 30 has an annular channel 32 (FIGURES 17, 19 and 20) into which the marginal portion 33 of the diaphragm material is folded and tucked and then firmly secured to the mounting frame by crimping as will fully appear hereinafter.

The frame 30 of the diaphragm is provided with ears 34 having holes 35 for accommodating bolts which join members of the gas meter casing (not illustrated), the diaphragm structure being interposed between the casing members and thus providing a measuring chamber on each side of the diaphragm. A slot 36 in an ear 37 of the frame communicates with the exhaust or discharge passage in the meter casing in known manner.

As best seen in FIGURE 2 the apparatus of the present invention comprises in general suitable framework including a lower base plate 40, a centrally located main plate 41 and upright columns 42 supporting the main plate 41; a hold-down plate H; a floater plate F; doming mechanism D; tucking mechanism T; cutter mechanism C; crimping mechanism CM; cam means CA for actuating said mechanisms; a drive motor M and associated gear reduction unit G for driving the cam means; and a cutter motor R for driving the cutter mechanism C.

Before describing the various mechanisms of the apparatus in detail the operational sequence of the apparatus will now be described with particular reference to FIGURES 2 and 17–21.

Figures 11, 12:
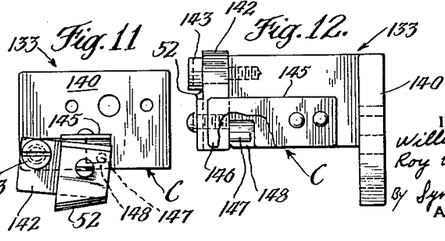
Figure 18:
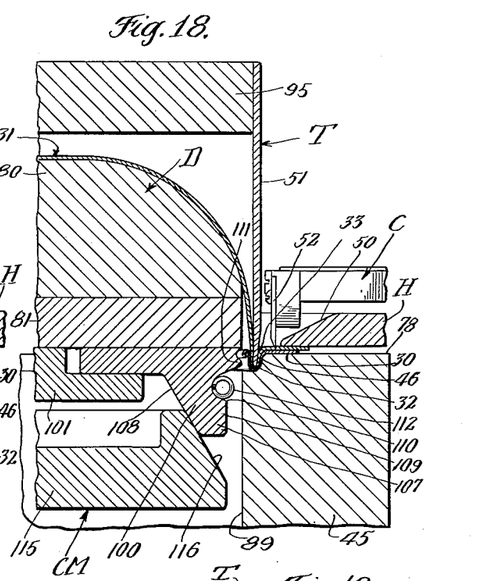
Figure 19:
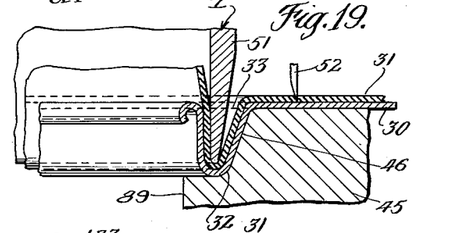
Figure 20:
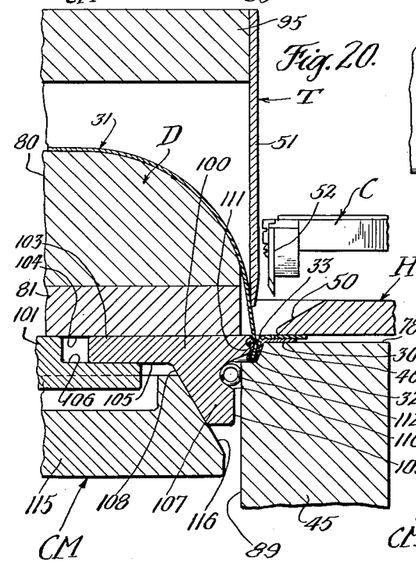
Figure 21:
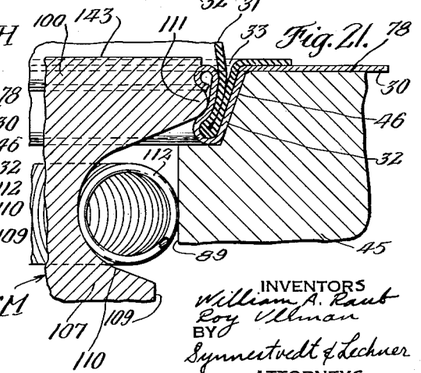

As seen in FIGURE 2, the annular frame 30 of the diaphragm is positioned on an apertured ring-like block 45, with its annular channel 32 accommodated in an annular recess 46 provided on the aperture side of the block, and a sheet of diaphragm material is placed on top of the frame. Then the hold-down plate H is actuated to hold the frame and diaphragm material. The mechanism D then domes the diaphragm material (see FIGURE 17). Next, the tucking mechanism T folds and tucks the marginal portion 33 of the diaphragm material into the annular channel 32 of the frame (see FIGURE 12). Then the cutting mechanism C cuts the excess diaphragm material off to provide a circular diaphragm (FIGURES 18 and 19). Finally, the crimping mechanism CM operates to crimp the diaphragm material in the channel 32 and provide a gas-tight connection (FIGURES 20 and 21).

Certain details of various of the components of the machine will next be described.

Figure 3:
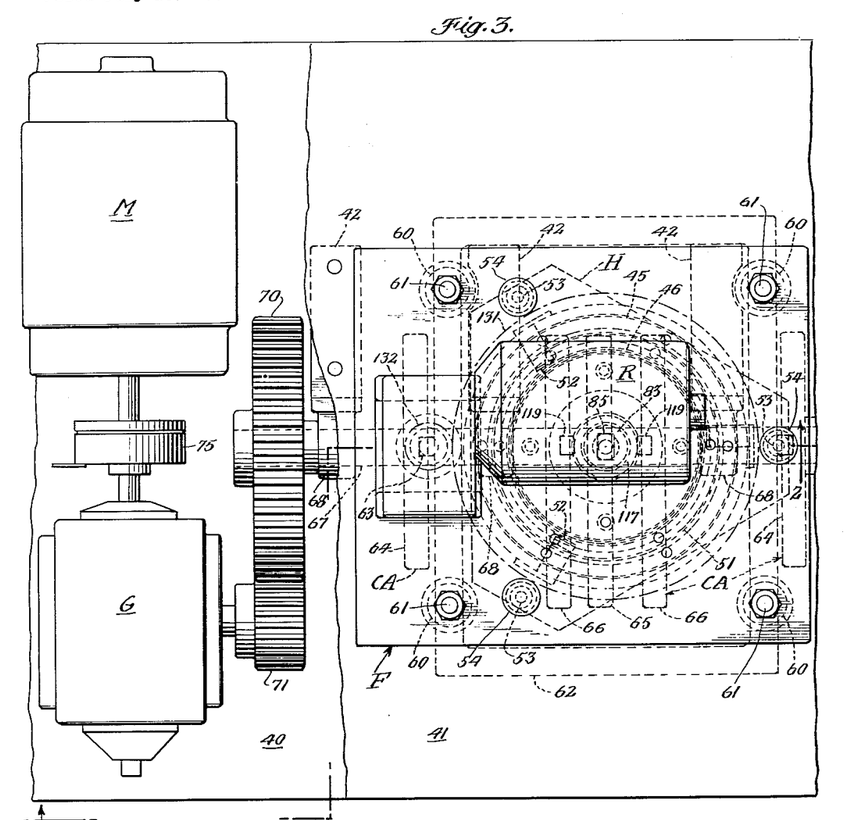
FIGURE 3 is a plan view of the apparatus taken as indicated by the line 3—3 of FIGURE 2.
Figure 9:
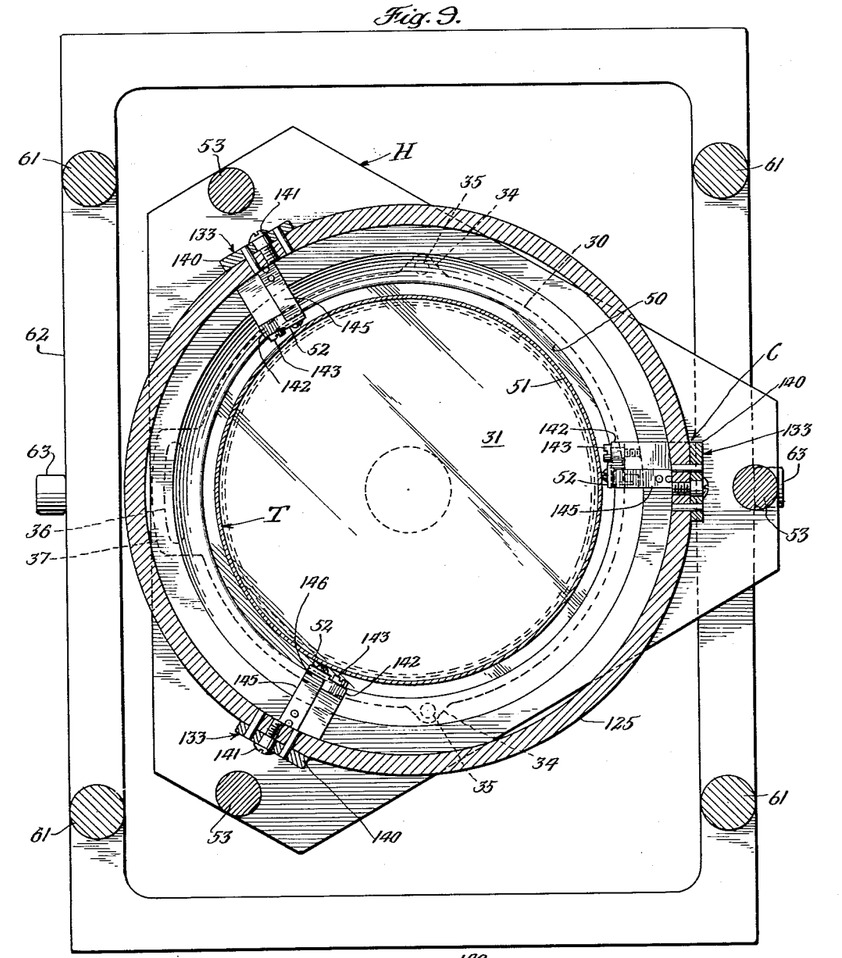
FIGURE 9 is an enlarged plan section taken on the line 9—9 of FIGURE 2 and illustrating tucker mechanism, a hold-down plate and associated cutter mechanism employed in the apparatus.
Figure 10:
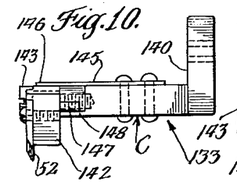
FIGURES 10, 11 and 12 are enlarged assembly views of the cutter blades of FIGURE 9.

The hold-down plate H (FIGURES 2, 3 and 9) is of triangular shape in plan view and is provided with a chamfered circular central aperture or opening 50 of sufficient diameter to clear the cylindrical tucker blade 51 and the knife blades 52 to be hereinafter fully described. The hold-down plate is suspended from the floater plate F by three depending stems 53 of three connected air-operated bellows devices 54 mounted on the floater plate F.

The floater plate F is mounted for up and down reciprocation in four bushings 60, secured in the main plate 41, by means of four depending guide posts 61 to the lower ends of which a rectangular lifter ring 62 is secured as clearly seen in FIGURE 2. The lifter ring 62 is provided with a pair of cam followers 63—63 adapted to operate in the cam grooves of a pair of floater cams 64—64 of the cam means CA (see also FIGURE 15).

With reference to FIGURE 2, the cam means CA includes a dome cam 65, the pair of floater cams 64—64 just mentioned, and a pair of crimper cams 66—66, all keyed on a cam shaft 67 mounted in bearing blocks 68 secured by bolts 69 to the upright columns 42. The drive gear 70 keyed on the cam shaft 67 meshes with a pinion 71 of the motor driven gear unit G. Spacer collars 72, 73 and 74 are provided to suitably space the cams along the cam shaft.

The cam shaft clutch 75 couples the motor M and the gear reduction unit G. The clutch is preferably of the conventional magnetic type and, when energized, causes rotation of the cam shaft 67.

The block 45 above referred to is secured by means of bolts 77 to the main plate 41 in axial alignment with the central opening 50 of the hold-down plate H. The flat top surface 78 of the block 45 (FIGURES 14, 17–20) acts as an anvil on which the frame 30 of the diaphragm structure is placed with its annular channel 32 in the annular recess 46 of the block. As will further appear, when the hold-down plate H is moved to the position shown in FIGURE 2 and when the bellows devices 54 are expanded, the frame 30 and diaphragm material are firmly clamped between the anvil and the hold-down plate H.

Figures 7, 8:
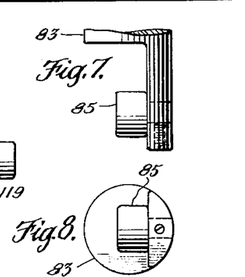
FIGURE 7 is an enlarged elevation of the lower portion of a dome stem employed in the apparatus.
FIGURE 8 is a bottom view of FIGURE 7.
Figure 14:
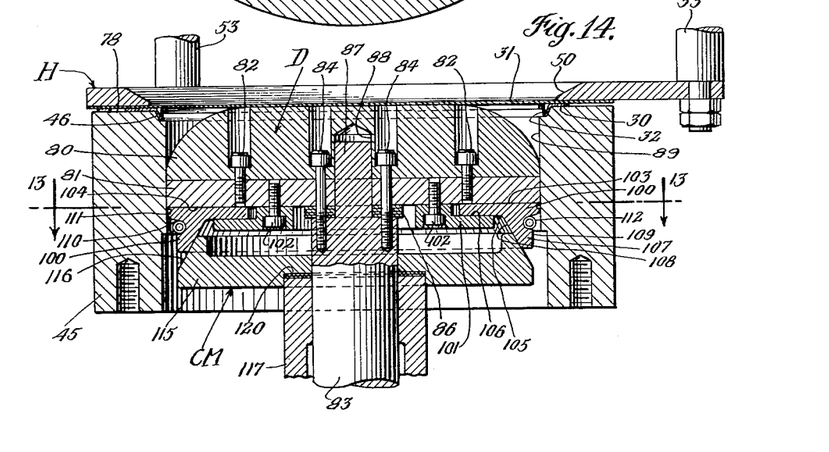
FIGURE 14 is a cross section taken on the line 14—14 of FIGURE 13.

The doming mechanism D (see FIGURES 2 and 14) comprises a circular dome member 80 secured to a support such as circular dome plate 81 by screws 82, a dome stem 83 to which the dome member and dome plate are secured by screws 84 and a cam follower 85 carried by the stem 83 at its lower portion (FIGURES 2, 7 and 8). The cam follower 85 operates in the cam groove of the dome cam 65. Shims 86 are employed between the dome stem 83 and dome plate 81 to enable accurate set up of the dome member 80. The dome member is accurately centered on the dome stem by means of a pilot 87 provided on the dome stem which fits a central bore 88 in the dome and dome plate (FIGURE 14). The dome member and dome plate have sliding fit in the bore 89 of the annular block 45.

The tucking mechanism T comprises a circular tucker base plate 95 secured by screws 96 to the floater plate F, the cylindrical tucker blade 51 secured by screws 97 to the plate 95.

The crimping mechanism CM comprises a multiplicity of radially disposed, circularly arranged crimping members 100 of wedge shape (FIGURE 13), supported by means of a shouldered circular retaining plate 101 (FIGURES 2 and 14) which is secured to the under face of the dome plates 81 by screws 102. Referring to FIGURES 14, 17, 18 and 20, each crimping member 100 has a flat top face 103 in sliding contact with the under face 104 of the dome plate 81 and a flat under face 105 in sliding contact with the flat face 106 of the shouldered retaining plate 101. Each of the crimping members 100 is also provided with a downwardly extending portion 107, the inner face 108 of which is inclined and the outer face 109 of which is provided with a band receiving groove 110 and with a crimping nose and groove 111 adjacent its top surface.

Figure 13:
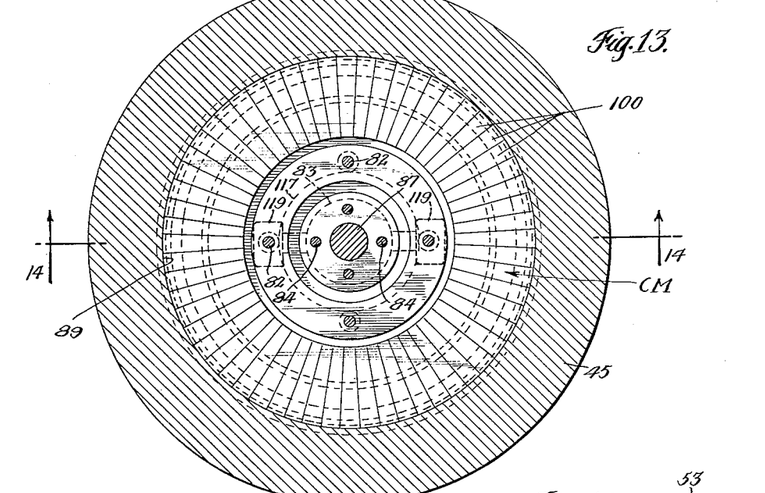
FIGURE 13 is a plan section taken on the line 13—13 of FIGURE 14 and illustrating crimping mechanism of the apparatus.

When these crimping members are assembled in circular fashion as shown in FIGURE 13, a flexible band such as spring 112 is inserted in the band grooves to yieldingly hold the crimping members as shown.

Associated with the crimping members is a crimper ring 115 having an outer conical face 116 mating with the inclined faces 108 of the crimping members. When the crimper ring 115 is in the position shown in FIGURE 14, the crimping members are in retracted position and the crimping noses 111 thereof have slight clearance with the bore 89 of block 45. When the crimper ring is moved upwardly to the position shown in FIGURE 20, the crimping members are moved to expanded position and the crimping noses 111 perform the crimping operation.

Figure 4:
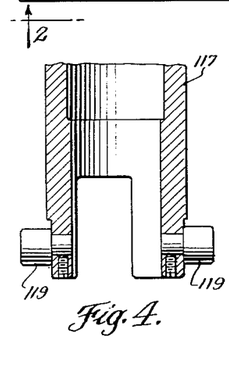
FIGURE 4 is an enlarged vertical cross section of the lower portion of a crimper stem employed in the apparatus, the section being taken on the line 4—4 of FIGURE 5.
Figures 5, 6:
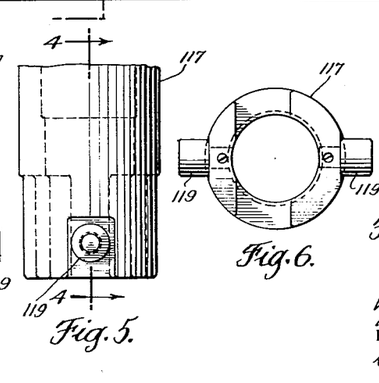
FIGURE 5 is a side view of FIGURE 4.
FIGURE 6 is a bottom view of FIGURE 4.

The crimper ring 115 is secured to a downwardly extending crimper stem 117 by screws 118 (FIGURE 2). This stem is tubular and has sliding fit with the dome stem 83 and has its lower end portion bifurcated to provide clearance for the dome cam 65. As is best seen in FIGURES 4, 5 and 6, cam followers 119—119 are provided at the bifurcations for operation in the cam grooves of the crimper cams 66—66. Shims 120 are employed between the crimper ring and crimper stem to enable accurate set up of the crimper ring. The crimper stem is guided in its up and down movement in a bearing bushing 121 carried by the main plate 41.

Referring now particularly to FIGURES 2 and 9–12, the cutter mechanism C comprises a cutter ring 125 mounted in a flanged guide ring 126 secured to the floater plate F by screws 127, a bearing ring 128 secured to the floater plate by screws 129, a ball bearing 130 between the cutter ring 125 and bearing ring 128, a ring gear 131 carried by the cutter ring, a driving pinion 132 meshing with the ring gear 131 and a plurality of knife assemblies 133 carried by the cutter ring.

The cutter clutch 134 connects the shaft 135 of the driving pinion 132 with the output shaft 136 of the ratio motor R. The clutch is similar to clutch 75.

The knife assemblies 133 (FIGURES 10, 11 and 12) each comprise a bracket 140 secured to the cutter ring 125 by screws 141, a pivot arm 142 pivotally mounted on the bracket 140 by a pivot pin 143, a knife blade 52 secured to the pivot arm 142 and a leaf spring 145 riveted to the bracket and having its free end 146 engageable by the pivot arm in its upward movement during the cutting operation. The pivot arm is provided with a stop pin 147 engageable with a ledge 148 of the bracket 140 to limit downward tilt of the pivot arm and knife blade. The function of the knife assembly is to sever the diaphragm material to be crimped to the mounting ring from the sheet.

Figure 22:
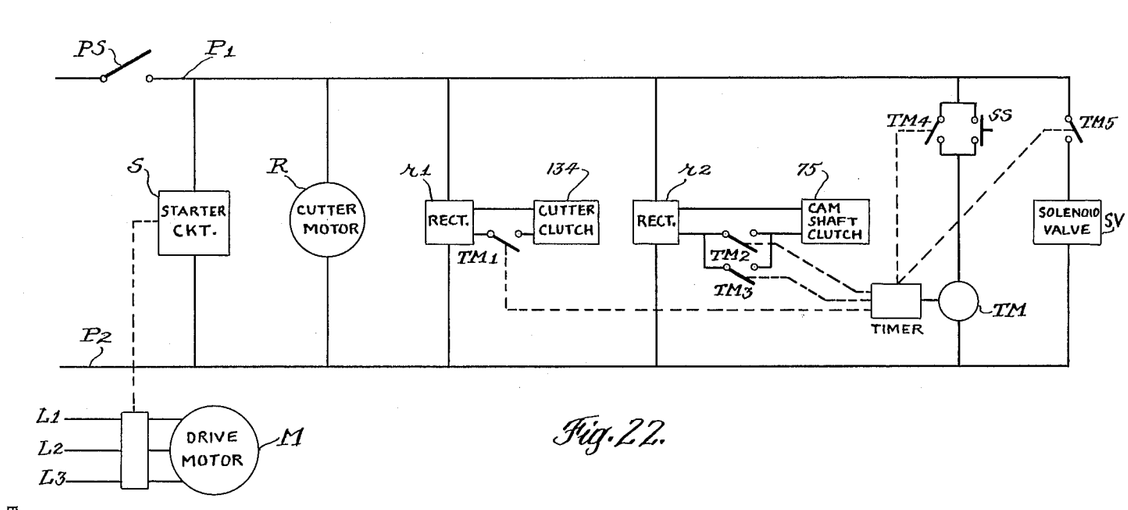
FIGURE 22 is a schematic wiring diagram.

The wiring diagram of FIGURE 22 diagrammatically illustrates the manner in which certain of the components of the invention are adapted to be activated. Power is supplied through lines $P_1$ and $P_2$ when the main power switch PS is closed. A conventional starter circuit connected across the power lines $P_1$ and $P_2$ is for use in stopping and starting the drive motor M. The cutter motor R also connected across the power lines is continuously energized when the main switch is closed. A rectifier $r_1$ is connected across the power lines and is continuously energized when the main switch is closed and this rectifier is adapted to supply power to the cutter clutch 134 when the contacts $TM_1$ are closed. A rectifier $r_2$ is continuously energized and this is adapted to supply power to the cam shaft clutch 75 when one or the other of the contacts $TM_2$ or $TM_3$ is closed. A conventional timing mechanism TM is connected across the lines via the switch $TM_4$ and the starter switch SS. The timer operates when either of the switches is closed. A solenoid valve V is also connected across the power line through the switch $TM_5$. The valve admits air to the bellows 54 to cause expansion of the same and exhausts air to cause retraction. As is indicated, all of the contacts $TM_1$ to $TM_5$ are interconnected to the timer mechanism and operated thereby.

Having thus described the various mechanisms of the apparatus in detail, the method of operation will now be described.

Assume that the apparatus is stopped in the start position. The cams 64, 65 and 66 will be in the positions shown in FIGURE 15. The floater plate F will be raised by the floater cam 64 so that the cutter motor R, the bellows devices 54, the tucker blade 51, the hold-down plate H, the lifter ring 62 and the cutting mechanism C will have been moved to their fully raised positions. The start positions of these parts in FIGURE 2 are indicated in dot and dash lines having the reference characters F′, R′, 54′, 51′, H′, 62′ and C′. In start position the dome cam and the crimper cam will have positioned the doming mechanism D and the crimping mechanism CM as shown in full lines in FIGURE 2. The timer mechanism has opened all of the contacts $TM_1$ to $TM_5$. With the above mechanisms in the positions just described a frame 30 is positioned on the annular block 45 and a sheet of diaphragm material is placed on the frame. The size diaphragm material is sufficient size to accommodate the various operations described.

At this time the main power switch is closed and the starter is activated to start the drive motor M. The start swtich SS is activated which energizes the timing mechanism which operates to close contacts $TM_4$ which maintain the starter energized for a complete cycle and at the same time the contacts $TM_3$ are closed to energize the cam shaft clutch and start the shaft and cams in rotation.

Figure 15:
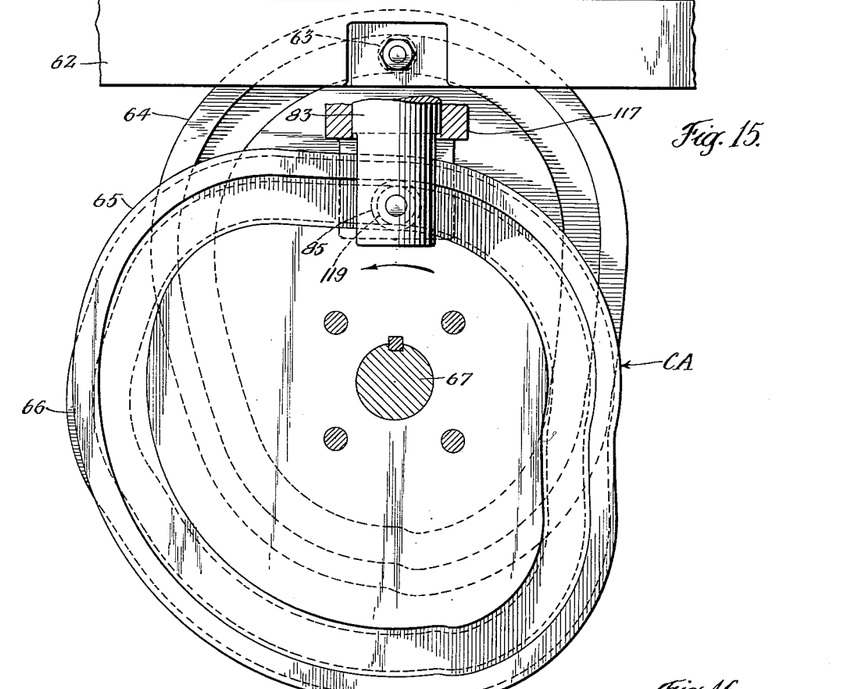
FIGURE 15 is an enlarged fragmentary vertical cross section taken substantially on the line 15—15 of FIGURE 2 and illustrating the contour of the dome, crimper and tucker cams shown in FIGURE 2.
Figure 16:
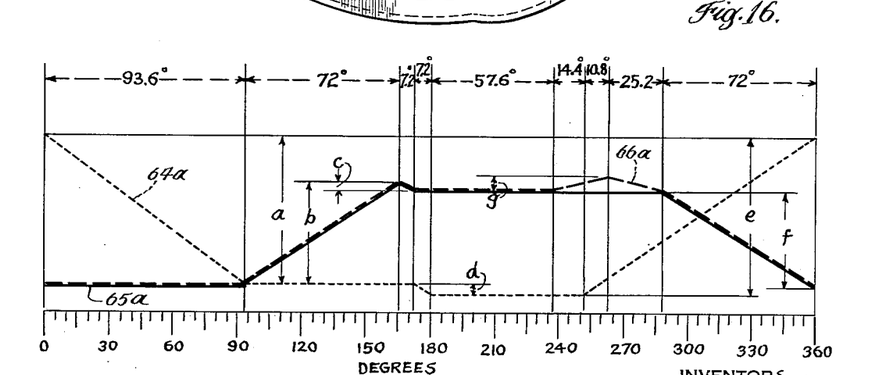
FIGURE 16 is a cam chart diagrammatically illustrating the development of the cams of FIGURE 15.

In further explanation of the above and of subsequent operations, reference is made to the cam diagram of FIGURE 16 which is a 360° development of the cams. In the diagram the dome cam is represented by the full line 65a, the floater cams by the line of short dots 64a and the crimper cams by the line of longer dots 66a. By referring to the 0° point of this diagram, which corresponds to the start positions of the cams in FIGURE 15, it will be seen that the floater cams are at their high points and that the dome and crimper cams are at their low points.

Figure 17:
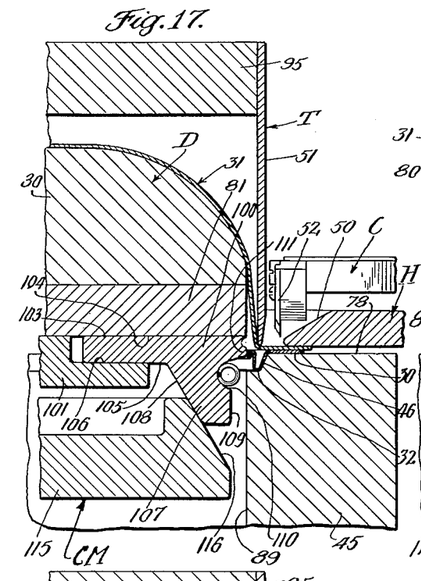
FIGURES 17 to 21 inclusive, illustrate various steps in assembling and securing the flexible diaphragm material to the frame, FIGURE 17 illustrating the doming step, FIGURES 18 and 19 the tucking and cutting steps and FIGURES 20 and 21 the crimping step.

The cams rotate in the direction of the arrow of FIGURE 15 and upon 93.6° of rotation the floater cams 64 have caused the floater plate F and associated parts to lower (the distance $a$ in the diagram), thus lowering the tucker and cutter mechanisms to the positions shown in FIGURES 2 and 17. It will be noted that during this rotation the dome and crimper cams are in dwell so that no movement is imparted to the doming and crimping mechanisms. At this time the timer closes contacts $TM_5$ to close the solenoid valve which admits air to the bellows 54 which expand and cause the stems 53 to move the hold-down plate H in firm but yielding engagement with the diaphragm material and the annular mounting frame.

In the next 72° of rotation of the cams the floater cams are in dwell and the dome and crimper cams cause the dome and crimping mechanisms to move upwardly (the distance $b$ in the diagram) thus doming the diaphragm material as shown in FIGURE 17, it being noted that the diaphragm material is drawn inwardly between the hold-down plate and block and thence upwardly under the rounded lower edge of the cylindrical tucker blade 51. For forming the dome, the size of the original sheet is such to provide sufficient material. It should also be noted that since the dome and crimping mechanisms move bodily together during this phase of operation and no crimping action takes place.

In the next 7.2° of rotation of the cams, the dome and crimper cams cause the dome and crimper mechanisms to move slightly downwardly (the distance $c$ in the diagram) while the floater cams remain in dwell. The downward movement of the dome releases the tension on the domed material and it becomes somewhat slack.

In the next 7.2° of rotation the dome and crimper cams remain in dwell and the floater cams cause the floater plate, hence the tucker mechanism, to move downwardly (the distance $d$ in the diagram) so that the tucker blade 51 engages the material, folding and tucking the same into the annular channel 32 of the frame 30, taking up said slack and pulling the material taut over the dome (see FIGURE 18). The downward movement of the floater plate also effects movement of the knife blades 144 into the diaphragm material. At this time (180°) the timer mechanism opens contacts $TM_3$ so that the clutch is de-energized and the cam shaft stopped. Also, the timer mechanism closes the contacts $TM_1$ to energize the cutter clutch and causes the motor R to rotate the knife assemblies 133 and sever the diaphragm material tucked in the mounting ring from the excess sheet material.

After a short time the timer mechanism causes the contacts $TM_1$ to open and stop rotation of the knife assemblies and the contacts $TM_2$ close to start the cam shaft in rotation. In the first 57.6° of this rotation the dome, floater and crimper cams remain in dwell. In the next 14.4° of rotation the dome and floater continue in dwell while the crimper cams start to raise the crimper ring 115 to start to expand the crimping members 100. At this time, the tucker is still holding the diaphragm material in the channel and in the next 10.8° of rotation the floater cams start to raise the floater, and the tucker moves out of the channel 32, while the crimper continues to rise to the distance $g$ until the crimping members 100 are fully expanded to crimp the diaphragm material firmly in the channel 32 of the frame 30.

During the next 25.2° of rotation the dome remains in dwell, the floater continues to rise and the crimper ring moves downward through the distance $g$ so that the crimper members 100 are retracted. During the final 72° of rotation the floater continues to rise through distance $e$ and crimper and dome move down through the distance $f$. At 360°, the timer mechanism opens the contacts $TM_2$ to de-energize the cam shaft clutch 75 and stop the rotation of the cam shaft. The timer mechanism also opens the contacts $TM_5$ to de-energize the solenoid valve SV so that the hold-down plate is retracted. Also, the timer mechanism opens the switch $TM_4$ so that the timer stops operating. All of the components are in start position. The diaphragm assembly and excess sheet material are removed.

Subsequent diaphragm assemblies are made in the same manner as described.

We claim:

1. Apparatus for making a diaphragm assembly including a centrally apertured annular mounting frame and diaphragm material extending across the aperture, the marginal portion of the material being crimped in a channel formed on the frame, the apparatus comprising: mechanism for supporting said mounting frame; first means for supporting a sheet of diaphragm material with a portion of generally dome-like contour extending across said aperture and a portion extending over said channel; second means to engage the diaphragm material over said channel and fold and tuck a portion of the same into the channel; third means providing for relative movement of said first and second means toward each other for said tucking operation; fourth means having parts disposed respectively on opposite sides of said channel, the parts being relatively movable toward one another while engaged with the frame for crimping the folded and tucked material in the chanel; fifth means supporting said parts and providing for said engagement and said relative movement; and mechanism to cause the following operations: to activate said third means for the performing of said tucking operation and to activate said fifth means for the performing of said crimping operation.

2. Apparatus for making a diaphragm assembly including a centrally apertured annular mounting frame and diaphragm material extending across the aperture, the marginal portion of the material being crimped in a channel formed on the frame, the apparatus comprising: mechanism for supporting said mounting frame and a substantially flat sheet of diaphragm material; first means movable through the aperture of said mounting frame to engage the diaphragm material extending across the aperture and form the same into generally dome-like shape, the material for the dome being supplied by movement of material of the sheet; second means movable toward and away from said mounting frame for folding and tucking a portion of the diaphragm material in the channel of said mounting frame; third means having parts disposed respectively on opposite sides of said channel, the parts being relatively movable toward one another while engaged with the frame for crimping the folded and tucked material in the channel; and mechanism to cause the following operations: to activate said first means to perform said doming operation, to activate said second means to perform said tucking operation, and to activate said third means to perform said crimping operation.

3. Apparatus for making a diaphragm assembly including a centrally apertured annular mounting frame and diaphragm material extending across the aperture, the marginal portion of the material being crimped in a channel formed on the frame, the apparatus comprising: mechanism for supporting said annular mounting frame and a substantially flat sheet of diaphragm material; first means movable toward and away from said supporting mechanism for yieldably clamping the sheet of diaphragm material thereon; second means movable through the aperture of said mounting frame to engage the diaphragm material extending across the aperture and form the same into generally dome-like shape, the material for the dome being supplied by movement of material of the sheet between said support and clamp; third means movable toward and away from said mounting frame for folding and tucking a portion of diaphragm material in the channel of said frame; fourth means radially movable with respect to the center of the frame to engage the frame to crimp the tucked diaphragm material in the channel; fifth means to sever the diaphragm material tucked in the channel from the sheet; and mechanism to cause the following operations: to activate said first means to perform the clamping operation; to activate said second means to perform said doming operation and to move relatively away from the domed material; to activate said third means to perform said tucking operation; to activate said fifth means to perform said cutting operation; to activate said third means to move the third means out of said channel; and to activate said fourth means to perform said crimping operation.

4. Apparatus for making a diaphragm assembly including a centrally apertured annular mounting frame and diaphragm material extending across the aperture, the marginal portion of the material being crimped in a channel formed on the frame, the apparatus comprising: a main frame; an apertured ring-like block mounted on said main frame and being formed with a peripheral recess on the apertured side of the block, the block providing a support for said mounting frame and a substantially flat sheet of diaphragm material, a portion of which is to be secured to the mounting frame; a floater plate disposed above said block and supported by said main frame and adapted for reciprocating motion along the axis of said aperture toward and away from said block; an apertured hold-down plate disposed above said block, the plate being for use in yieldably clamping the piece of diaphragm material on said block; means connecting said hold-down plate to said floater plate and providing for the hold-down plate to reciprocate therewith and to be independently reciprocal toward and away from said block; a generally cylindrically-shaped member connected to said floater plate to reciprocate therewith, the member being disposed generally within said apertures and being for use in folding and tucking diaphragm material in the channel of said mounting frame; cutting mechanism including a cutter disposed above said block for use in severing the diaphragm material from the diaphragm material sheet; means connecting said cutting mechanism with said floater plate and providing for the cutting mechanism to be reciprocal therewith and for the cutter to be independently rotatable in a circular path spaced outwardly from the recess on said block; a dome member disposed within said block aperture and adapted for reciprocating motion along said axis and within said cylindrical member, the dome member having a generally dome-like contour and being for the purpose of forming diaphragm material into a generally dome-like form; a crimping mechanism disposed within said block and adapted for reciprocating motion along said axis and including a plurality of crimping members adapted to reciprocate in a direction transverse said axis for engaging the channel in said mounting frame and crimping the diaphragm material within the channel; means for selectively reciprocating said floater plate, said dome member and said crimper mechanism including a shaft adapted to be rotated and having a floater cam, a domer cam and a crimper cam mounted thereon together with interconnections between the respective cams and the floater plate, the dome member and the crimper mechanism; and means for selectively rotating said cutter.

5. In apparatus of the kind described, doming and crimping mechanism comprising: a dome member having a dome-like contour; means providing for reciprocating motion of said dome member along an axis; a crimper ring having a peripheral surface surrounding said axis and inclined thereto; means providing for reciprocation of said ring along said axis; a retaining plate mounted on said dome member; a plurality of wedge-shaped crimping members movably supported between said dome member and said retaining plate, the direction of movement of said member being transverse said axis and each member having an inclined surface abutting the inclined surface of said crimper ring; spring means surrounding each of said members and urging the same toward said axis and causing said engagement of inclined surfaces; and means providing for the crimper ring to move toward and away from said dome, said surfaces being inclined so that movement of the crimper ring toward said dome causes said crimper members to move outwardly against the force of said spring.

6. In apparatus of the kind described, cutting and tucking mechanism comprising: a floater plate mounted to reciprocate back and forth along an axis; a generally cylindrically-shaped tucker member connected to and extending downwardly from said plate and concentrically arranged about said axis; a guide ring mounted on said plate and surrounding said tucker member; a cutter ring rotatably mounted on said guide ring; at least one cutter mounted on said cutter ring; a ring gear fixed to said cutter ring; a motor mounted on said floater plate; and means interconnecting the motor and the ring gear to cause rotation of the gear, the cutter ring and the cutter, said means including a selectively operable clutch.

References Cited in the file of this patent

UNITED STATES PATENTS

| | | |
|---|---|---|
| 1,465,102 | Towle | Aug. 14, 1923 |
| 1,823,047 | Hothersall | Sept. 15, 1931 |
| 1,968,904 | Page | Aug. 7, 1934 |
| 1,984,223 | Ludington | Dec. 11, 1934 |
| 2,275,112 | Shippy | Mar. 3, 1942 |
| 2,282,959 | Gibbs | May 12, 1942 |